June 11, 1935.  A. O. JAEGER  2,004,758
CATALYTIC APPARATUS
Filed Dec. 2, 1927  4 Sheets-Sheet 1
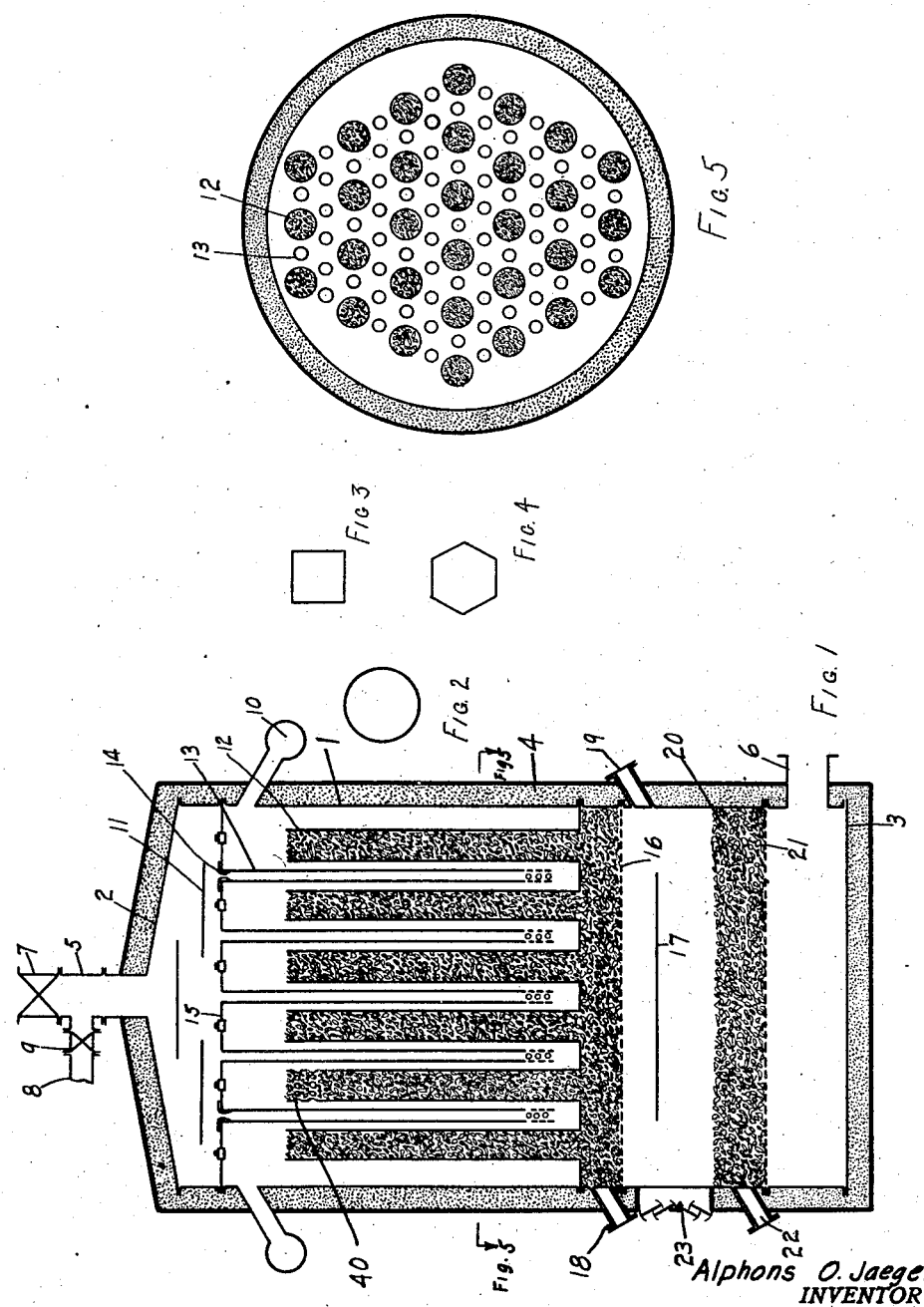
Alphons O. Jaeger
INVENTOR
BY Robert Ames Norton
ATTORNEY

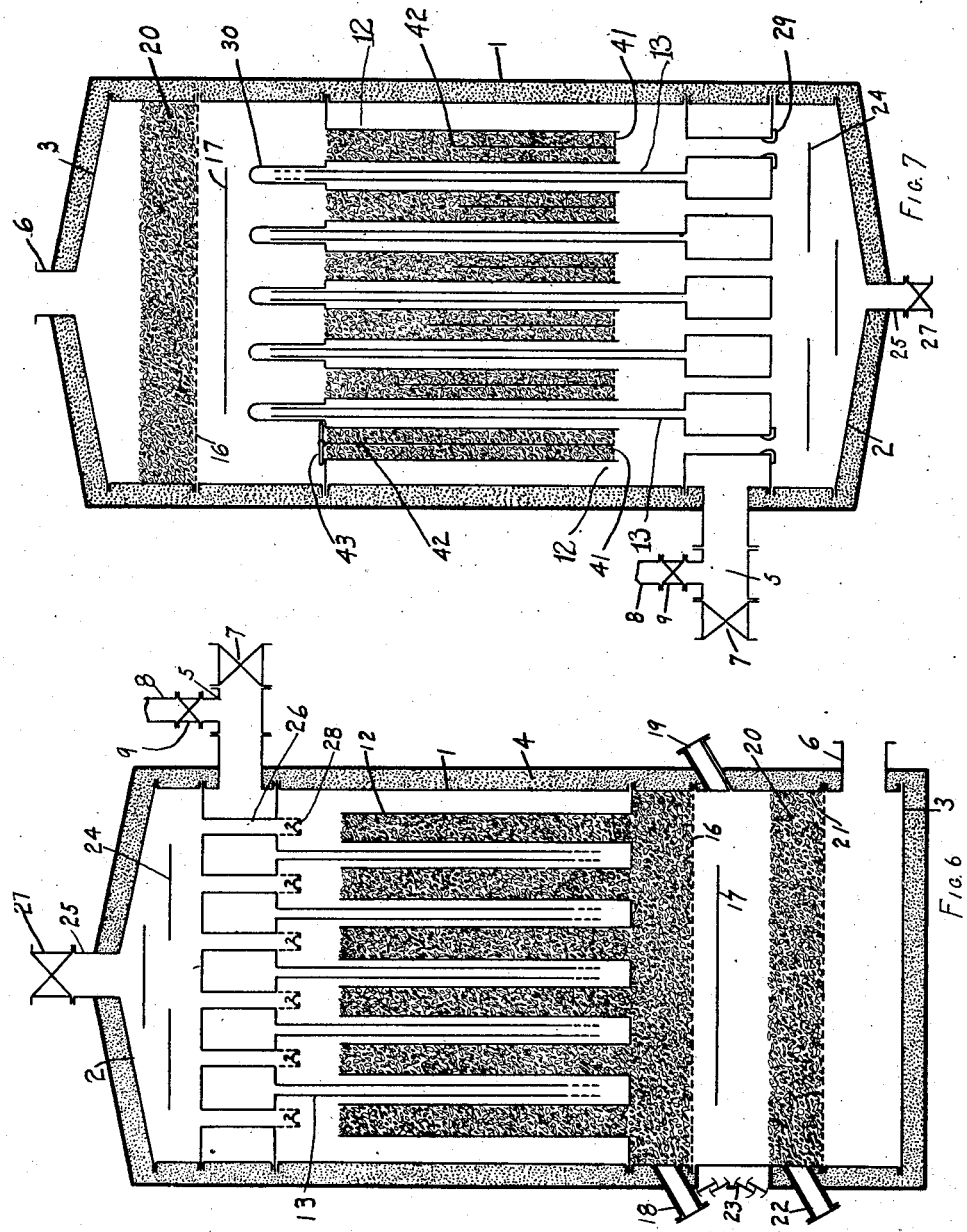

June 11, 1935.  A. O. JAEGER  2,004,758
CATALYTIC APPARATUS
Filed Dec. 2, 1927   4 Sheets-Sheet 4
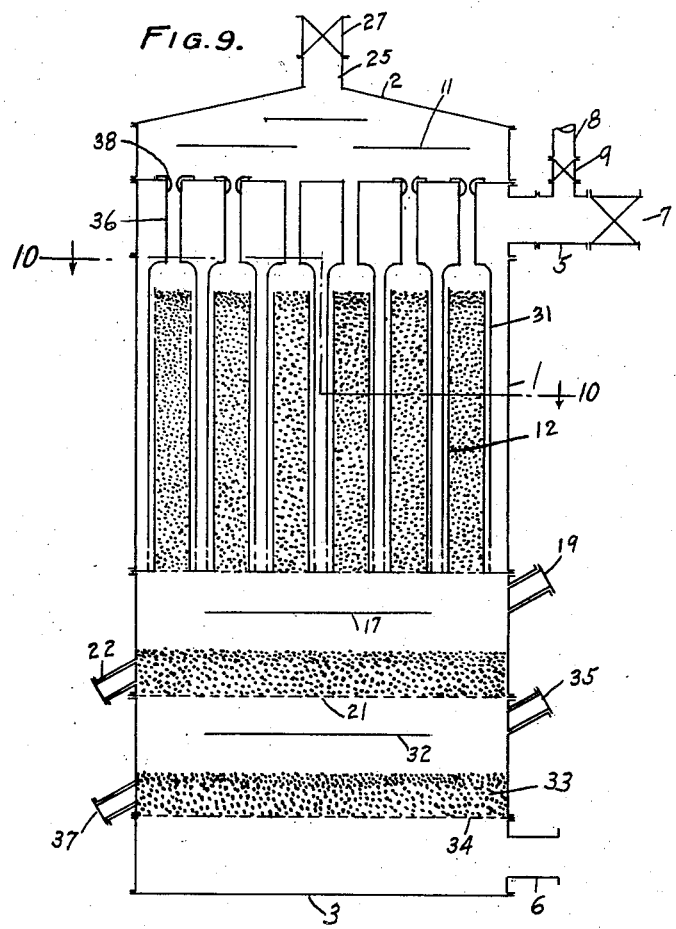
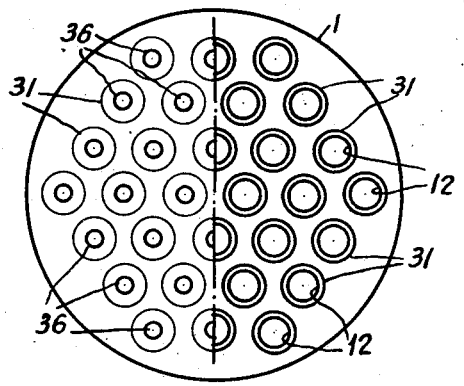
Alphons O. Jaeger
INVENTOR.
BY Robert Ames Norton
ATTORNEY Patented June 11, 1935

2,004,758

UNITED STATES PATENT OFFICE 2,004,758

CATALYTIC APPARATUS

Alphons O. Jaeger, Crafton, Pa., assignor, by mesne assignments, to American Cyanamid & Chemical Corporation, a corporation of Delaware Application December 2, 1927, Serial No. 237,212

4 Claims. (Cl. 23—228)

This invention relates to catalytic apparatus and more particularly to converters for vapor phase catalytic reactions especially those requiring accurate temperature control.

Many vapor phase catalytic reactions require a powerful temperature control because of the large amount of heat evolved in some of the reactions and because it is necessary to provide an accurate temperature control in order to maintain reaction conditions for optimum production. The necessity for control is particularly needed in oxidation reactions such as the oxidation of sulfur dioxide to sulfur trioxide and many organic compounds to intermediate products. Examples of these reactions are anthracene-containing materials to anthraquinone, toluol or derivatives of toluol to corresponding benzaldehydes and benzoic acids, benzol to maleic acid, acenaphthene to acenaphthaquinone, bisacenaphthylidenedione, naphthaldehydic acid, naphthalic anhydride, and hemimellitic acid, fluorene to fluorenone, eugenol and isoeugenol to vanillin and vanillic acid, methyl alcohol and methane to formaldehyde, ethyl alcohol to acetic acid, ethylene chlorhydrine to chloracetic acid and the like. Organic oxidations in which impurities are selectively burned out or transformed into easily removable substances also require accurate control. Examples of such reactions are the purification of crude anthracene or phenanthrene by the selective catalytic combustion of carbazol, the purification of crude naphthalene, crude mononuclear aromatic hydrocarbons and crude aliphatic compounds such as high sulfur oils and motor fuels. Ammonia from coal tar may also be purified by selective oxidation of organic impurities and requires a good temperature control.

In the past there have been two general types of converters, those cooled by the reaction gases themselves and those cooled by baths, either boiling or nonboiling. The former have found their main use in the catalytic oxidation of sulfur dioxide to sulfur trioxide while the latter have been used mainly for the oxidation of organic compounds to intermediate products. The gas cooled converters, for example as illustrated in the sulfuric acid art have in the past belonged mainly in two categories, the simple layer converter in which layers of catalyst are cooled to a certain extent by the reaction gases and by radiation from the converter shell, and tubular converters in which the catalyst is placed in tubes in which the catalyst is cooled by a flow of gases over the tubes. The former type converter is illustrated by the well-known Grillo sulfuric acid converter and the latter type is exemplified by the Knietsch type converters.

Both the types of gas cooled converters present serious disadvantages. The layer type provides inadequate cooling except at very low loadings and is entirely inapplicable to highly exothermic organic oxidations. The tubular converter has a high cooling capacity which cooling capacity, however, is not fully automatic and the construction of tubular converters is very expensive requiring a large number of gas tight joints.

A modification of the tubular converter has been proposed by Tentelew. In this converter a number of tubes are arranged in a converter chamber similar to that of a layer type converter and filled with catalyst. The incoming gases enter the chamber and pass downwardly through the catalyst filled tubes. This converter presents the advantage of cheap construction requiring no gas-tight connections in the tubes and it provides better cooling than does the simple layer converter owing to the greater radiation surface of the catalyst tubes. There is, however, a very sluggish heat transfer from the tubes to the surrounding gas as the latter is not caused to flow over the tubes with the high velocity so necessary for effective heat transfer from a metal to a gas.

The present invention combines all of the simplicity and cheapness of construction coupled with reliability of the Tentelew converter and at the same time provides an automatic cooling which is superior even to the cooling possible with tubular converters and presents the tremendous advantages that it is substantially proportional to the reaction gases passing through the converter and therefore to the heat evolved therein. Uniformity of temperature is therefore achieved automatically through very large ranges and good yields coupled with high outputs are readily obtained. So powerful is the cooling that this type converter is not only excellent in the field of relatively mildly exothermic reactions, such as catalytic oxidation of sulfur dioxide to sulfur trioxide, the oxidation of methyl alcohol to formaldehyde, and many reduction reactions, but it may even be applied to strongly exothermic oxidations of organic compounds, thus entering a field in which gas cooled converters have been relatively unsuccessful and in many cases rendering the use of expensive bath cooled converters unnecessary. According to the present invention catalyst tubes are provided as in the ordinary Tentelew design but instead of permitting these tube walls to radiate heat to relatively stagnant gases the incoming gases are passed through heat exchange elements arranged adjacent to the catalyst tubes and in indirect heat exchanging relation therewith, the flow of gases is then reversed and they pass in direct heat exchanging relation with the catalyst tubes followed by a second reversal, after which the gases flow through the catalyst in the tubes. By this means the velocity of the gases passing over the catalyst tubes is enormously increased and is uniformly directed so that the cooling is not only greatly enhanced but it is possible to definately control the amount of cooling of each catalyst tube.

The invention will be described in greater detail in connection with the drawings in which:

Fig. 1 is a vertical section through a simple modification of the present invention;

Figs. 2, 3, and 4 are diagrammatic illustrations of cross sections which may be used for the catalyst tube;

Fig. 5 is a cross section taken along the line 5—5 of Fig. 1.

Fig. 6 is a vertical section through a modified converter of the type shown in Fig. 1 illustrating the provision of direct auxiliary gas introduction;

Fig. 7 is the vertical section similar to the type shown in Fig. 6 and showing modified tube form;

Fig. 9 is a vertical cross section through a modified converter shown in Fig. 8 but provided with direct auxiliary gas introduction;

Fig. 10 is a cross section taken along the line 10—10 of Fig. 9.

Figure 8:
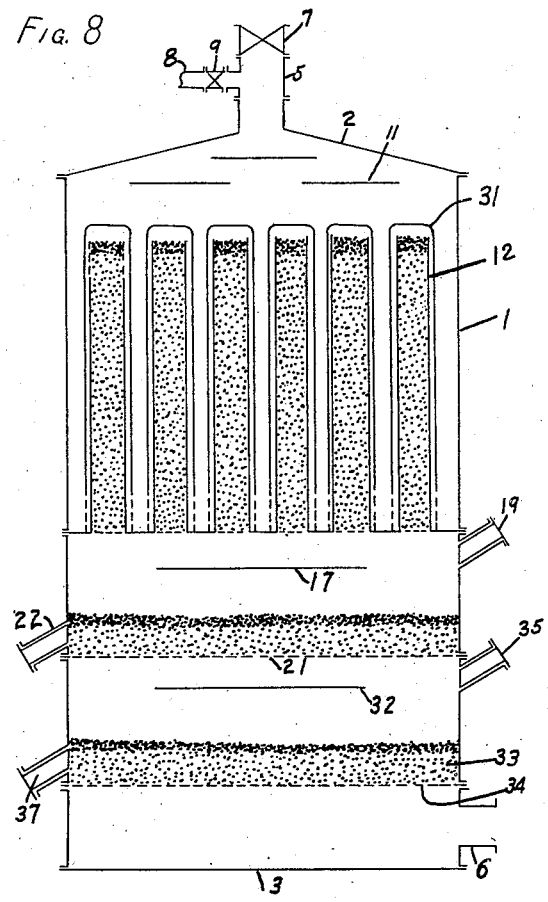
Fig. 8 is a vertical cross section through a somewhat different form of converter arranged for closely confined gas flow.

In the modification shown in Fig. 1 the converter consists in a shell 1, top piece 2, bottom piece 3, and insulation 4. An inlet pipe 5 provided with a valve 7 and with an auxiliary pipe 8 controlled by the valve 9 leads into the top piece 2 of the converter and an exhaust pipe 6 permits gases to flow out from the bottom of the converter. The catalyst chamber of the converter is provided with a lower partition and catalyst filled Tentelew tubes 12. The catalyst extends somewhat below the tubes 12 forming a very thin layer supported by the screen 16. A perforated upper partition 15 is arranged under the top piece 2 with tubes 13 extending down between the catalyst tubes and being provided with perforations at their lower ends. Suitable orifice plates or plugs 14 are provided to cause a larger proportion of the gases to flow down the central tubes in order to compensate for the greater peripheral cooling effect due to the converter shell. A baffle plate 17 is mounted below the screen 16 and is followed by a layer of catalyst 20 supported by the screen 21. Catalyst may be charged into the catalyst tubes through suitable holes in the partition 15 normally closed by plugs and catalyst can be removed through the pipe 18. Similarly the catalyst layer 20 can be charged through the pipe 19 and removed through the pipe 22. In operation, reaction gases enter through the pipe 5 and are distributed by the means of the baffles 11 to the various heat exchange tubes 13 through which they flow down to the bottom of the space surrounding the catalyst tubes 12. The flow is then reversed and continues in heat exchanging relation with the catalyst tubes and the gases after reaching the top of the catalyst tubes pass downwardly through them. If desired the catalyst tubes may be provided with perforations 40 in order to provide for a more gradual entrance of the gases over a larger area. The partly reacted gases passing out through the screen 16 strike the baffle plate 17 which throws them out causing them to be thoroughly and uniformly mixed and also to become cooled by contact with the converter shell which cooling can be further enhanced by air cooling the shell through ventilators 23. The mixed and cooled gases then pass down through the catalyst layer 20 where the last portion of the reaction takes place and finally flow out through the pipe 6.

The catalyst tubes may be of any of the shapes shown in the Figs. 2, 3, or 4 or any other suitable shape. Round tubes are cheapest and strongest and for many reactions are preferable. Wherever it is desired to confine gases very closely to the catalyst tubes on the reverse flow it is necessary to pack the catalyst tubes more closely and this may be more readily effected with polygonal tubes. Of course, the closer the tubes are spaced the greater will be the velocity of the reaction gases passed over them and hence the greater will be the effectiveness of the heat exchange.

The modification shown in Fig. 1 is well suited for the catalytic oxidation of sulfur dioxide to sulfur trioxide and can also be used for certain types of mildly exothermic organic reactions. The automatic cooling feature operates effectively and maintains the temperature constant within wide ranges. Sudden increases in temperature may be counteracted by direct introduction of cold or hot gases through the manifold 10.

When highly exothermic organic reactions are to be carried out it is not only desirable to closely space the catalyst tubes in order to thereby increase the velocity of the reaction gases passing over them but it is also desirable to use relatively small tubes so that all parts of the catalyst are near to the tube surface and there is no tendency to form hot spots which is particularly important when, as is frequently the case, the catalyst is a poor conductor of heat. It is also frequently desirable to omit uncooled catalyst layers when dealing with such highly exothermic reactions such as many organic oxidations.

Fig. 6 shows a modification of Fig. 1 in which the main gases flow through the inlet pipe 5, and pass through the heat exchange tubes described in Fig. 1, but provision is also made for direct introduction of reaction gases. This is effected through pipe 25 controlled by the valve 27 which leads into the top piece 2 of the converter. Baffles 24 distribute the gases which then flow down through tubes 26 provided with removable bottoms 28 and perforations throughout the lower ends. The gases thus directly introduced flow out through the perforations and then through the catalyst without passing down through the heat exchange tubes 13. This construction can be used for reactions such as those described in connection with Fig. 1.

Fig. 7 shows an inverted modification of a converter similar to that shown in Fig. 6 in which the catalyst tubes 12 are provided with individual catalyst retaining screens 41 hanging from hangers 43 by means of wires 42. In this modification the heat exchanging tubes 13 are extended beyond the catalyst tubes 12 in tubular extensions 30. By this means they are subjected to hot reacted gases and tend to prevent forming a cool spot at the top of the catalyst tubes. This figure also shows the use of orifice plugs 29 to vary the proportion of the gases directly introduced through pipes 26. Obviously, of course, similar provision for regulating the proportional flow through the different tubes may be employed in the construction shown in Fig. 6.

Fig. 8 shows a modified structure in which closed end tubes 31 are placed over the catalyst tubes 12, and are provided with perforations at their lower end. The incoming gases flow down around the outside of these closed-end tubes, in through the perforations, out through the bottom, then through the annular spaces defined by the catalyst tubes 12 and closed-end tubes 31 and finally down through the catalyst. The reaction gases are very closely confined to the catalyst tubes and very high velocity and very effective heat exchange is obtained. The converter of Fig. 8 is, therefore, well suited for reactions requiring a very accurate heat control. Fig. 8 also illustrates a provision of more than one uncooled catalyst layer, the second layer 33 being supported by a screen 34 and provided with filling tubes 35 and catalyst emptying tubes 37. A baffle plate 32 is interposed between the first layer and the second layer. Where highly exothermic reactions, such as certain organic oxidations, are carried out in a converter of the type shown in Fig. 8 it may be desirable to omit the uncooled layers. For the catalytic oxidation of sulfur dioxide to sulfur trioxide, however, they are very effective in bringing about the last few per cent of conversion. In this modification as in the others the catalyst has been shown conventionally by stippling. Obviously, of course, it may be of any type and more than one catalyst may be used, thus for example the catalysts may vary in strength and activity in the direction of the gas flow or where a composite reaction takes place in stages, one stage may be carried out in one catalyst layer and another stage in a further layer.

Fig. 9 illustrates a modification of the type of converter shown in Fig. 8 in which the tubes 31 are provided with narrow open necks 36 extending into a perforated partition under the top piece of the converter and permit direct introduction of some gases into the top of the tubes 31 and thence into the catalyst. The necks 36 may advantageously be provided with orifice plugs 38 to provide more intense cooling in the central tubes. The effect of the auxiliary introduction is similar to that in Figs. 6 and 7.

In addition to the strongly exothermic oxidation reactions referred to above, the apparatus of the present invention may be used with excellent effect for other reactions, some of which are not so strongly exothermic. Thus for example, ammonia can be oxidized to nitrogen oxides, preferably with the omission of uncooled catalyst layers. The catalysts may be uniform or may vary in their strength in the direction of gas flow.

Catalytic reductions with or without the use of pressure are also readily carried out in the converters of this invention. Thus, for example, nitro compounds may be catalytically reduced to the corresponding amines or other intermediate reduction products. Nitrobenzene, nitrotoluol, nitrophenol, nitronaphthalene, and the like are compounds which can be effectively reduced in converters of the present invention. Hydrogenation reactions are also readily carried out in converters of the present invention, for example the hydrogenation of benzol to cyclohexane, phenol to cyclohexanol, naphthalene to tetraline and decaline, crotonaldehyde to normal butyl alcohol, acetaldehyde to ethyl alcohol and the like.

Various synthetic reactions, such as for example the reduction of oxides of carbon to methanol, higher alcohols and ketones or synthetic motor fuel mixtures are well adapted for the converters of the present invention. The processes may be carried out with or without pressure. Other synthetic reactions such as the synthesis of ammonia, hydrocyanic acid and the like, may also be carried out in automatic gas cooled converters according to the present invention.

Other catalytic reactions are of importance, such as the catalytic water gas process, catalytic dehydrogenations, dehydrations, condensations and polymerizations. The catalytic splitting off of carbon dioxide from polycarboxylic acids is another reaction for which converters of the present invention are well adapted. Thus, for example, phthalic anhydride may be catalytically split to benzoic acid in converters described above. Composite reactions such as the splitting off of carboxylic groups from phthalic anhydride in a reducing atmosphere to produce benzaldehyde, benzyl alcohol, and the like, the catalytic splitting of the carboxylic group of phthalid to produce benzyl alcohol and other composite reactions may effectively be carried out in converters of the present invention, it being noted that endothermic as well as exothermic reactions are practicable.

Cracking reactions and destructive hydrogenations such as, for example, destructive hydrogenations of crude phenanthrene, are examples of a further type for which the apparatus of the present invention is well adapted. In general almost any vapor phase catalytic reaction can be carried out by means of apparatus employing the principles of the present invention.

In the claims and in the specification the expression "indirect heat exchanging relation" is used to define the heat exchange which takes place through a moving current of gas in contradistinction to direct heat exchange through a stationary metal wall.

This application describes and claims converters some of which are described but not claimed per se in my prior application Serial No. 162,020, filed January 19, 1927, and now Patent No. 1,660,511, issued February 28, 1928.

What is claimed as new is:

1. In converters of the Tentelew type in which the catalyst is contained in vertical tubes mounted at the bottom ends in a tube sheet, the improvements which comprise means for causing at least part of the reaction gases entering the converter to flow substantially parallel to the catalyst tubes in indirect heat exchanging relation thereto, and means for causing the reaction gases to thereafter reverse their flow and contact with the exterior walls of the catalyst tubes.

2. A converter comprising in combination a catalyst chamber being provided with Tentelew type catalyst tubes mounted at their lower ends in a tube sheet and closed-end tubes fitting over said catalyst tubes and spaced therefrom, and means for permitting reaction gases entering the catalyst chamber to pass over the outside of the closed end tubes in a direction parallel to the flow of gas through the catalyst tubes and then, after reversing their direction of flow to enter the annular spaces defined between the closed-end tubes and the Tentelew tubes at a point near the base of the Tentelew tubes.

3. A converter according to claim 1 in which means are provided for introducing part of the reaction gases directly into the catalyst in the Tentelew tubes.

4. A converter according to claim 1 in which means are provided to vary the proportionate flow of reaction gases along the Tentelew tubes in different concentric zones.

ALPHONS O. JAEGER.